United States Patent
Omura et al.

(10) Patent No.: US 11,407,683 B2
(45) Date of Patent: Aug. 9, 2022

(54) PROCESS FOR REFORMING THE FLY ASH AND APPARATUS THEREFOR

(71) Applicant: TOKUYAMA CORPORATION, Shunan (JP)

(72) Inventors: Kohei Omura, Shunan (JP); Kenichi Kakizono, Shunan (JP); Takuya Seki, Shunan (JP); Takeshi Kawano, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 16/978,578

(22) PCT Filed: Mar. 5, 2019

(86) PCT No.: PCT/JP2019/008560
§ 371 (c)(1),
(2) Date: Sep. 4, 2020

(87) PCT Pub. No.: WO2019/176640
PCT Pub. Date: Sep. 19, 2019

(65) Prior Publication Data
US 2021/0017076 A1    Jan. 21, 2021

(30) Foreign Application Priority Data

Mar. 13, 2018  (JP) .............................. JP2018-044892

(51) Int. Cl.
| | | |
|---|---|---|
| *C04B 7/26* | (2006.01) |
| *B02C 23/14* | (2006.01) |
| *C04B 7/44* | (2006.01) |
| *C04B 7/52* | (2006.01) |
| *F23J 1/00* | (2006.01) |
| *B09B 3/40* | (2022.01) |
| *B09B 101/30* | (2022.01) |

(52) U.S. Cl.
CPC ............... *C04B 7/26* (2013.01); *B02C 23/14* (2013.01); *B09B 3/40* (2022.01); *C04B 7/44* (2013.01); *C04B 7/52* (2013.01); *F23J 1/00* (2013.01); *B09B 2101/30* (2022.01)

(58) Field of Classification Search
CPC .... C04B 7/26; C04B 7/44; C04B 7/52; B02C 23/14; B09B 3/0083; B09B 2220/06; F23J 1/00
See application file for complete search history.

(56) References Cited

U.S. PATENT DOCUMENTS

| | | | |
|---|---|---|---|
| 2021/0032163 A1* | 2/2021 | Kakizono | ............. B09B 3/0083 |
| 2021/0238089 A1* | 8/2021 | Omura | ..................... B07B 9/02 |

FOREIGN PATENT DOCUMENTS

| | | | |
|---|---|---|---|
| JP | 4-346884 | A | 12/1992 |
| JP | 6-126252 | A | 5/1994 |
| JP | 8-119693 | A | 5/1996 |
| JP | 10-45444 | A | 2/1998 |
| JP | 11-60299 | A | 3/1999 |
| JP | 2000-213709 | A | 8/2000 |
| JP | 2007-780 | A | 1/2007 |
| JP | 2008-126117 | A | 6/2008 |
| JP | 2011-156517 | A | 8/2011 |
| KR | 10-1120221 | B1 | 3/2012 |
| WO | WO 2016/157122 | A1 | 10/2016 |

OTHER PUBLICATIONS

Edited by Kasai, Yoshio, "The Concrete overview", Jun. 10, 1998, pp. 87-88.
International Search Report, issued in PCT/JP2019/008560, dated May 21, 2019.
Extended European Search Report for European Application No. 19766623.3, dated Nov. 15, 2021.
Chinese Office Action and Search Report for Chinese Application No. 201980018186.4, dated Sep. 22, 2021.

* cited by examiner

*Primary Examiner* — Anthony J Green
(74) *Attorney, Agent, or Firm* — Birch, Stewart, Kolasch & Birch, LLP

(57) ABSTRACT

A process for reforming the fly ash, including the heating step that heats a raw fly ash powder containing the unburned carbon at a temperature of 780 to 1000° C. to decrease the amount of the unburned carbon contained in the raw fly ash powder; the classifying step that introduces the heat-treated fly ash containing the unburned carbon in decreased amounts obtained through the heating step into a classifying apparatus in the state of being heated at a high temperature so as to separate the fly ash into a coarse powder and a fine powder; the fine powder recovering step that recovers the fine powder of the heat-treated fly ash obtained through the classifying step by using a dust-collecting apparatus; and the milling step that mills the coarse powder of the heat-treated fly ash obtained through the classifying step until a 45 μm sieve residue becomes not more than 34% by mass, and then recovers the milled powder.

9 Claims, 1 Drawing Sheet

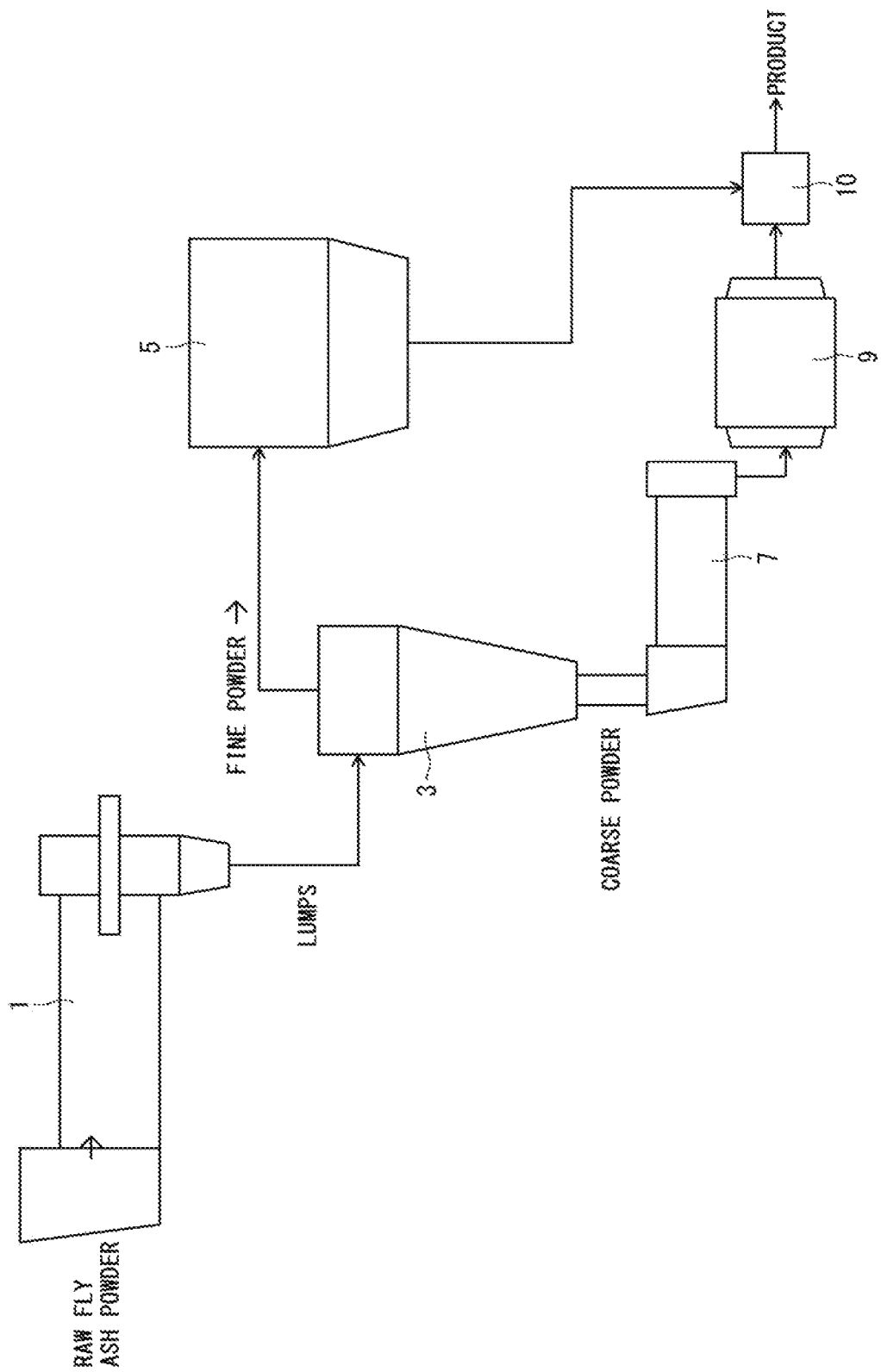

PROCESS FOR REFORMING THE FLY ASH AND APPARATUS THEREFOR

TECHNICAL FIELD

This invention relates to a process for reforming the fly ash as well as to an apparatus used for carrying out the process.

BACKGROUND ART

When the fly ash is used as an admixture with the cement or the concrete, it is, usually, desired that the content of the unburned carbon in the fly ash is better small.

In general, however, the fly ash generated from the coal burning thermal power plant contains the unburned carbon in various amounts, say, about 15% by mass at the greatest. Therefore, only some of the fly ash can be used as the admixture.

To obtain the fly ash containing the unburned carbon in decreased amounts (reformed fly ash), there have been proposed methods by which the fly ash is heated and the unburned carbon is removed upon being burned (e.g., patent documents 1 and 2).

However, it is very difficult to industrially and efficiently obtain the reformed fly ash that can be used as the admixture mentioned above by heating the fly ash and by removing the unburned carbon by burning it.

That is, to remove the unburned carbon from the fly ash by burning it, however, the fly ash must be heated at a temperature of not lower than 700° C. This is because at temperatures lower than 700° C., very extended periods of time are necessary for removing the unburned carbon. The amount of the unburned carbon can be greatly decreased in short periods of time if the temperature for heating is elevated. As the temperature becomes high, however, the fly ash grains tend to melt-adhere together and turn into lumps. The higher the temperature, therefore, the larger the ratio of forming lumps. Besides, extended periods of time become necessary for cooling the lumps. In order to suppress the formation of lumps as much as possible, therefore, the temperature for heating should be set to be not higher than 780° C. To remove the unburned carbon, therefore, the temperature of heating should best be in a range of 700 to 780° C. It is, however, very difficult to conduct the heating maintaining the temperature in such a limited range.

This is because the reaction (burning reaction) of the unburned carbon with oxygen generates heat and, besides, the amount of the unburned carbon undergoes a change as the fly ash continues to be heated. Namely, as the amount of the unburned carbon changes, it happens that oxygen is not often fed in proper amounts into the heating furnace or the temperature varies in the heating furnace. Moreover, the amount of the unburned carbon does not remain constant in the fly ash that is heated. For instance, when the fly ash containing much unburned carbon is heated, the temperature tends to be elevated unnecessarily.

Since diverse fly ashes containing the unburned carbon in varying amounts are heated, it is very difficult to set the temperature of heating to lie in a very limited range of 700 to 780° C. In particular, the heat balance in the furnace tends to be easily lost at a moment of changing over the raw fly ash powder that is to be heated often causing the temperature to be excessively elevated or lowered. There, further, occurs a problem in that oxygen becomes in short supply and the amount of the unburned carbon does not decrease to a sufficient degree. If the frequency of change-over is too high, then the raw material is often changed over while the optimum conditions are still being searched. As a result, it may often become almost impossible to obtain the product that can be favorably used as an admixture.

PRIOR ART DOCUMENTS

Patent Documents

Patent document 1: Japanese Patent Laid-Open No. 2008-126117
Patent document 2: Japanese Patent Laid-Open No. 11-060299

OUTLINE OF THE INVENTION

Problems that the Invention is to Solve

It is, therefore, an object of the present invention to provide a process for reforming the fly ash that contains the unburned carbon in varying amounts by reliably decreasing the amount of the unburned carbon in short periods of time to such a degree that the fly ash after reformed can all be used as an admixture through a relatively simple process, as well as to provide an apparatus therefor.

Means for Solving the Problems

In view of the above-mentioned problems, the present inventors have keenly forwarded the study and have discovered the fact that the fly ash even containing lumps permits fine particles (portions that are not yet substantially turning into lumps) to be easily cooled down and permits even massive large solid matters (lumps) to be turned into a reformed fly ash that can be favorably used as an admixture through operations such as classification and milling, and have thus completed the invention.

According to the present invention, there is provided a process for reforming the fly ash, including:

the heating step that heats a raw fly ash powder containing the unburned carbon at a temperature of 780 to 1000° C. to decrease the amount of the unburned carbon contained in the raw fly ash powder;

the classifying step that introduces the heat-treated fly ash containing the unburned carbon in decreased amounts obtained through the heating step into a classifying apparatus in the state of being heated at a high temperature so as to separate the fly ash into a coarse powder and a fine powder;

the fine powder recovering step that recovers the fine powder of the heat-treated fly ash obtained through the classifying step by using a dust-collecting apparatus; and the milling step that mills the coarse powder of the heat-treated fly ash obtained through the classifying step until a 45 μm sieve residue becomes not more than 34% by mass, and then recovers the milled powder.

In the process for reforming of the present invention, the following embodiments can be favorably employed.
(1) The amount of the unburned carbon is decreased down to less than 3% by mass through the heating step.
(2) Heating in the heating step is so executed that 50% by mass is not reached by the content of the massive grains that have a maximum diameter of not less than 150 μm contained in the heat-treated fly ash in which the amount of the unburned carbon has been decreased.

(3) In the classifying step, a classification point is so set that the 45 μm sieve residue of the fine powder obtained by the classification is not more than 34% by mass.
(4) The coarse powder of the heat-treated fly ash obtained through the classifying step is milled after having been cooled down to not higher than 200° C.
(5) The fine powder recovered from the dust-collecting apparatus is mixed with the milled powder recovered in the milling step.

According to the invention, further, there is provided an apparatus for reforming the fly ash including a heating apparatus capable of heating a raw fly ash powder containing the unburned carbon to a temperature of 780 to 1000° C., a classifying apparatus for classifying the heat-treated fly ash obtained by being heated by the heating apparatus, a dust-collecting apparatus for recovering a fine powder obtained by being classified by the classifying apparatus, a cooling apparatus for cooling a coarse powder obtained by being classified by the classifying apparatus, and a milling apparatus for milling the coarse powder cooled by the cooling apparatus.

In the reforming apparatus, it is desired that:
(1) The classifying apparatus is a wind power classifying apparatus; and
(2) The reforming apparatus further includes a mixing apparatus for mixing the fine powder recovered from the dust-collecting apparatus with the milled powder recovered from the milling apparatus.

Effects of the Invention

According to the reforming process of the present invention, the temperature for heating has been set to lie over a range which is so high and wide as from 780 to 1000° C. Therefore, even the raw fly ash powders containing the unburned carbon in different amounts can be heat-treated, in relatively short periods of time, continuously and maintaining stability, into a reformed fly ash that can be favorably used as an admixture with the cement or the concrete.

In the invention, in particular, the fly ash is heated at a high temperature and, therefore, large lumps are formed. The lumps, however, are classified in the state of being maintained at a high temperature (i.e., without being positively cooled) into a coarse powder and a fine powder making it, therefore, possible to execute the cooling efficiently and in short periods of time. In the form of large lumps without being classified, the fly ash can be cooled poorly efficiently and requiring very extended periods of time.

According to the invention, further, the reformed fly ash containing the unburned carbon in decreased amounts is recovered upon being milled and classified into a fine powder and a coarse powder. Here, by mixing them together again, the reformed fly ash that is obtained can all be efficiently used as an admixture with the cement or the concrete.

BRIEF DESCRIPTION OF THE DRAWING

FIG. 1 It is a view schematically illustrating a reforming apparatus for carrying out a reforming process of the present invention.

MODES FOR CARRYING OUT THE INVENTION

In the invention with reference to FIG. 1, a raw fly ash powder containing the unburned carbon is heated in a heating apparatus 1 (heating step). The heat-treated fly ash containing the unburned carbon in a decreased amount is introduced into a classifying apparatus 3 and is classified (classifying step). A fine powder obtained through the classification is recovered by a dust-collecting apparatus 5 (fine powder-recovering step) while a coarse powder obtained through the classification is cooled down in a cooling apparatus 7 (coarse powder-cooling step). The coarse powder is then introduced into a milling apparatus 9 (milling step) where it is milled down to a predetermined grain size and is then recovered. The thus recovered fine powder and milled product can be used in their own forms. Usually, however, the two are mixed together in a mixing apparatus 10, and the mixture thereof is shipped as a product for forming an admixture with the cement or the concrete.

Raw Fly Ash Powder;

The raw fly ash powder that is to be put to the reforming treatment is a fly ash that usually generates in the facilities that burn the coal, such as coal burning thermal power plants. The raw fly ash powder may also be a fly ash that generates after having burned the coal, or after having burned the fuel other than the coal or any fuel burned together with any inflammable wastes.

The grains contained in the raw fly ash powder have a maximum diameter which is, usually, less than 150 μm but not smaller than 100 μm.

The raw fly ash powder usually contains the unburned carbon in an amount of about 1 to about 15% by mass. The unburned carbon that is contained in large amounts, however, causes a problem when the fly ash is used as an admixture with the cement or the concrete (hereinafter often called simply as mixed material). For example, the unburned carbon, when contained in large amounts, float on the surfaces of the mortar or the concrete and may form darkened portions. Moreover, chemicals such as chemical blending agents mixed into the fly ash may be adsorbed by the unburned carbon, and may lose their functions.

The present invention is applied to reforming, specifically, the fly ash that contains the unburned carbon in amounts in excess of 3% by mass and, particularly, the fly ash that contains the unburned carbon in amounts in excess of 5% by mass.

Heating Step;

The raw fly ash powder is introduced into the heating apparatus 1 where it is heated to burn the unburned carbon and to thereby decrease the amount of the unburned carbon. The heating is executed so that the amount of the unburned carbon after heated is, for example, not more than 3% by mass, preferably, not more than 1% by mass and, specifically, not more than 0.1% by mass.

Methods of measuring the amount of the unburned carbon contained in the fly ash have been known. For example, the following methods have been known.
(a) A method of detecting the $CO_2 \cdot CO$ gases generated by the combustion by using infrared rays;
(b) A method of measuring the ignition loss and estimating the amount of the unburned carbon from the ignited raw material;
(c) A method of calculation based on the amounts of Methylene Blue adsorption;
(d) A method based on the bulk density testing; and
(e) A method of estimating the amount of the unburned carbon by the irradiation with microwaves.

Namely, the raw fly ash powder to be introduced into the heating apparatus 1 and the fly ash (reformed fly ash) heated in the heating apparatus 1 and coming out from the outlet port, are suitably sampled and measured for their amounts of the unburned carbon. The temperature for heating and the time for heating are then set based on the measured values.

In the invention, the temperature for heating in the heating apparatus 1 is set to lie in a range of 780 to 1000° C. and, preferably, 800 to 950° C. Since the heating is executed in such a high and wide temperature range, the fly ash can be continuously heated maintaining stability even in case the amount of the unburned carbon frequently varies in the fly ash that is introduced into the heating apparatus 1.

When the temperature for heating is lower than the abovementioned temperature range, an extended period of time is required before the amount of the unburned carbon decreases down to the predetermined range and the efficiency decreases. When heated to be higher than the above range, on the other hand, the fly ash grains melt-adhere together to form large lumps that may cause such inconveniences as clogging in the pipes and melt-adhesion on the wall surfaces of the heating apparatus 1. Besides, the fly ash undergoes a change in its chemical properties and often cannot be used as the mixing material.

According to the invention, the raw fly ash powder is heated in the high-temperature range as described above, and hence the fly ash grains melt-adhere together inevitably forming large lumps such as large grains having maximum diameters of not smaller than 150 µm. The fly ash that is to be heated contains the grains having maximum diameters of not larger than 150 µm, and from which it can be confirmed that the lumps are formed due to the heating. That is, the higher the temperature for heating or the longer the time for heating, the more the fly ash powder turns into lumps, i.e., larger lumps in larger amounts. The present invention, therefore, necessitates the classification and the cooling as will be described later. Here, however, if the fly ash powder turns into lumps to an excess degree, then a lot of work becomes necessary for the classification and milling, and the efficiency decreases. In the invention, therefore, it is desired that the temperature and time for heating are so set that the amount of lumps having maximum diameters of not smaller than 150 µm does not exceed 50% by mass and, specifically, 30% by mass under a condition that the amount of the unburned carbon is decreased down to lie in the abovementioned range.

In the invention, further, a generally employed heating furnace can be used as the heating apparatus 1 for executing the heating as described above. From the industrial point of view, however, there is desirably used a rotary kiln, a roller hearth kiln, a tunnel kiln, a fluidized bed furnace or a swirl flow type firing furnace. An externally heated type rotary kiln, however, is most desirably used since it makes it easy to control the temperature to lie over a range of 780° C. to 1000° C. and, therefore, to execute the treatment continuously and in large amounts. Though use of the rotary kiln may permit the fly ash powder to turn into lumps more easily than when any other heating systems are used, the process of the present invention can be highly effectively applied to solving this problem.

Classifying Step;

In the invention, the fly ash containing the unburned carbon in a decreased amount as a result of the heating (heat-treated fly ash) is introduced in the state of being heated at a high temperature into the classifying apparatus 3. That is, the heat-treated fly ash in the form of lumps containing fine powder is introduced from the heating apparatus 1 into the classifying apparatus 3 in the state of being heated at a high temperature though it may be naturally cooled to some extent through the pipe, and is classified into the fine powder and the coarse powder. The temperature of the heat-treated fly ash is not maintained while it is being conveyed from the heating apparatus 1 to the classifying apparatus 3. Therefore, the temperature may drop by about several tens of degrees centigrade to about hundreds of degrees centigrade while it is being conveyed through the pipe to the classifying apparatus 3. Here, however, the heat-treated fly ash is still maintained at a temperature of at least not lower than 300° C. In the state of being heated at this high temperature, the fine powder contained in the lumps is separated in the classifying apparatus 3. In other words, the heat-treated fly ash contains the coarse powder that cannot be easily cooled down as described later. Therefore, a very extended period of time is required before the heat-treated fly ash is naturally cooled down to a temperature below 300° C. According to the present invention, therefore, the coarse powder that difficultly cools down is separated without waiting for the temperature to be lowered down.

If the conveyance efficiency is maintained high from the heating apparatus 1 to the classifying apparatus 3, the temperature drops less. From this point of view, the heat-treated fly ash is conveyed at such an efficiency that the temperature thereof is preferably not lower than 400° C., more preferably, not lower than 500° C. and, particularly preferably, not lower than 550° C. at a moment when it is introduced into the classifying apparatus 3.

This is because if cooled before being classified, then the heat-treated fly ash discharged from the heating apparatus 1 contains much lumps having small specific surface areas. In this case, the cooling efficiency becomes poor and very extended periods of time are required for the cooling. That is, upon separating the heat-treated fly ash into the coarse powder that can be cooled poorly efficiently and the fine powder that has large specific surface areas and can be efficiently cooled down, it is allowed to employ cooling means that are respectively adapted to them and, therefore, to efficiently cool down the fly ash.

There is no specific limitation on the classifying apparatus 3, and there can be used any apparatus that is usually used for classifying the powders. From an industrial point of view, there can be preferably used the classifying apparatus 3 based on, for example, the centrifugal force classification, wind power classification, or sieve. Specifically, use of the wind power classifying apparatus makes it possible to execute the classification continuously and in large amounts. In executing the classification, furthermore, an improved cooling effect can be expected since the reformed fly ash comes in contact with large amounts of the air (wind). Specifically, the fine powder can be cooled more easily and, depending on the cases, no step is required for cooling the fine powder.

As the wind power classifying apparatus, there can be used a gravity classifying apparatus, an inertial classifying apparatus, a free vortex centrifugal classifying apparatus or a forced vortex centrifugal classifying apparatus.

Though there is no specific limitation on the classification point of the classifying apparatus 3, the JIS Standard specifies a 45 µm sieve residue. It is, therefore, desired to set the classification point relying on the 45 µm sieve residue. Concretely speaking, it is desired that the classification point is so set that the 45 µm sieve residue is not more than 34% by mass and, preferably, not more than 20% by mass. In dealing with the fly ash specified under the JIS Standards, the most generally used JIS Type II Standard specifies the 45 µm sieve residue to be not more than 40% by mass. In the present invention, however, this value is specified to be not more than 34% by mass. This is because the process according to the invention is supposed to be adapted to not only the JIS Standards but also to the fly ash standards of many other overseas countries (e.g., in the U.S., Taiwan and India, the 45 μm sieve residue is not more than 34% by mass).

From the standpoint of obtaining the reformed fly ash that can be favorably used as an admixture, furthermore, it is desired that the classification point is so set that the fine powder obtained through the classification has a median diameter $D_{50}$ of not more than 30 μm and, preferably, not more than 20 μm calculated as the volume. Usually, the cumulative volume 50% diameter (median diameter) $D_{50}$ of the fly ash used as the admixture is 10 to 40 μm, and it is also possible to attain a median diameter equivalent thereto. In this case, the ratio of recovering the coarse powder and the fine powder may vary depending on the degree of sintering the fly ash grains and the method of classification. However, the ratio of recovering the coarse powder is, usually, not more than 50% by mass.

The median diameter $D_{50}$ is measured by using, for example, a laser diffraction grain size distribution meter.

To set the 45 μm sieve residue and the median diameter $D_{50}$ as described above, it is recommended to set the classification point to be about 100 to about 500 μm irrespective of the means for classification, and then carry out the classification.

Step of Recovering the Fine Powder;

The heat-treated fine fly ash powder separated by being classified in the classifying apparatus 3 is recovered by the dust-collecting apparatus 5. Here, prior to being introduced into the dust-collecting apparatus 5, it is desired that the fine powder has been cooled down to a temperature of not higher than 200° C. and, specifically, not higher than 100° C. This is to reduce the thermal load on the dust-collecting apparatus 5 and to alleviate an increase in the cost that results from the use of heat-resistant materials and shortened life of the apparatus.

Means for cooling the fine powder is not specifically limited, and there can be employed any method that is usually used for cooling the powders, such as a rotary cooler from an industrial point of view. It is also allowable to use a fluidized bed drier that is used for drying powders, a paddle dryer, a spray dryer or a disk dryer for executing the cooling. There can be, further, used a double pipe to execute the cooling from the outer side or a heat exchanger to execute the cooling.

Here, as described earlier, the fine powder has now been separated from the coarse powder that can be cooled less. Therefore, the fine powder can be very easily cooled and its temperature greatly drops while it is still in the classifying apparatus 3 or while it is being conveyed through the pipe to the dust-collecting apparatus 5. Accordingly, the temperature and the amount of the coolant used in the cooling apparatus need be mildly set. Besides, when the wind power classifying apparatus is used as the classifying apparatus 3, use of the cooling apparatus can be omitted. In FIG. 1, therefore, the apparatus for cooling the fine powder has not been illustrated.

As for the dust-collecting apparatus 5 for recovering the fine powder, furthermore, there can be used any apparatus without particular problem, such as electric dust collector, bag filter or cyclone that has been used industrially.

The fine powder recovered by the dust-collecting apparatus 5 can be used in its form as an admixture.

Step of Cooling the Coarse Powder;

On the other hand, the heat-treated coarse fly ash powder separated from the fine powder in the classifying apparatus 3 can be used as a raw material for producing cement clinkers. For being used as a mixing material for the cement and concrete, however, the heat-treated coarse fly ash powder must be milled. This is because the coarse powder has very large grain sizes often containing very large lumps in excess of several centimeters to several tens of centimeters in sizes. Besides, the coarse powder has not been passed through the step of cooling, and can be cooled with difficulty. Moreover, the coarse powder accumulates large amounts of heat and is maintained at a considerably high temperature even after having been classified. To reduce the thermal load on the milling apparatus and to avoid the use of an expensive milling apparatus built in a heat-resistant structure, therefore, it becomes necessary to cool the coarse powder prior to milling it. It is desired to mill the coarse powder after it has been cooled down to, for example, not higher than 200° C. and, specifically, not higher than 100° C.

As the apparatus for cooling the coarse powder, there can be used the apparatus exemplified above for cooling the fine powder. However, the coarse powder cannot be easily cooled. As compared to the case of cooling the fine powder, therefore, the coolant will have to be used at considerably different temperatures and in considerably different amounts.

Step of Milling the Coarse Powder;

The coarse powder cooled as described above can also be used as a raw material for the production of cement clinkers. Since lumps having large maximum diameters as described above are much contained, however, the coarse powder is milled, like in the case of the above-mentioned fine powder, down to a 45 μm sieve residue of not more than 34% by mass and, specifically, not more than 20% by mass so that it can be used industrially. Here, it is desired that the coarse powder after milled has a median diameter $D_{50}$ of not more than 30 μm and, specifically, not more than 20 μm.

There is no specific limitation on the milling apparatus, and there can be used a tube mill, a vibration mill, a roller mill, a roll crasher or a hamper crasher that has been industrially employed.

Step of Mixing;

The milled product recovered from the milling apparatus can be used in its form as an admixture with the cement or the concrete. From the standpoint of obtaining the reformed fly ash having uniform quality containing the unburned carbon in a greatly decreased amount, however, it is desired that the milled product is introduced into the mixing apparatus 10 and is mixed with the fine powder recovered from the dust-collecting apparatus to obtain the product.

There is no specific limitation on the mixing apparatus 10, either. There can be used a mixing apparatus that has usually been used for mixing the powders, such as a stirrer type mixing machine or a jet stream mixing machine using the compressed air. The powders can also be mixed together in a blending silo, in a continuous powder conveying machine or in a pneumatic pumping equipment.

The thus obtained reformed fly ash contains the unburned carbon in a decreased amount, has its grain size suitably adjusted, and can be used as an admixture with the cement or as an admixture with the concrete in a customary manner.

EXAMPLES

The present invention will now be concretely described by way of Examples to which only, however, the invention is in no way limited.

In the following experiments, the following raw fly ash powder was put to the reforming.

Raw Fly Ash Powder;

Fly ash powder generated in a coal burning thermal power plant located in Japan.

Amount of the unburned carbon: 3.4% by mass

45 μm sieve residue: 18.2% by mass

The amount of the unburned carbon and the 45 μm sieve residue were measured in compliance with the ignition loss testing method and the 45 μm sieve residue testing method (wire sieving method) specified under the JIS A 6201. The median diameter $D_{50}$ is a volume-based value as measured by using the laser diffraction grain size distribution meter.

Described below are the basic procedures for reforming the raw fly ash powder.

(1) The raw fly ash was heated by using the continuous externally heated rotary kiln. The raw material and the air for burning were fed at constant rates. The revolving speed of the rotary kiln and the inclination thereof were set constant in order to set the heating time constant. The soaking zone residence time of the kiln calculated according to the Sullivan's formula was set to be about 15 minutes, and the heating temperatures were set to be 750° C., 780° C. and 850° C.

(2) The fly ash right after heated (heat-treated fly ash) was classified through a sieve of a perforation size of 150 μm, and was separated into a course powder and a fine powder.

(3) The coarse powder and the fine powder were respectively air-cooled at room temperature.

(4) By using the ball mill, the coarse powder was milled until the 45 μm sieve residue was not more than 34% by mass.

(5) The coarse powder after milled (milled powder) and the fine powder after classified were put into a plastic container, shook and mixed together.

Comparative Example 1

In the procedure 1, the raw fly ash was heated at 750° C. The content of the unburned carbon was 1.3% by mass and left room for improvements.

The 45 μm sieve residue was 15.0% by mass. No lump was observed.

Example 1

In the procedure 1, the raw fly ash was heated at 780° C. A content of the unburned carbon has sufficiently decreased down to 1.0% by mass.

A 45 μm sieve residue was 16.0% by mass.

The heat-treated fly ash obtained through the procedure 1 was sieved according to the procedure 2. A coarse powder recovery ratio was 2.0% by mass, and lumps had been formed to some degree.

The fine powder was recovered at a ratio of 98.0% by mass. A 45 μm sieve residue of the fine powder was 14.3% by mass. The fine powder possessed a median diameter $D_{50}$ of 13.7 μm.

The coarse powder was milled and was mixed with the fine powder. A 45 μm sieve residue of this mixture was 14.8% by mass.

Example 2

In the procedure 1, the raw fly ash was heated at 850° C. The fly ash showed very favorable results such as a content of the unburned carbon of 0% by mass. However, a 45 μm sieve residue was as large as 39.5% by mass.

The obtained heat-treated fly ash was sieved according to the procedure 2. A coarse powder recovery ratio was 25.9% by mass, and lumps had been formed to a considerable degree.

The fine powder was recovered at a ratio of 74.1% by mass. A 45 μm sieve residue of the fine powder was 18.3% by mass. The fine powder possessed a median diameter $D_{50}$ of 10.3 μm.

The coarse powder was milled, and was mixed with the fine powder. The mixture thereof showed a 45 μm sieve residue of 24.0% by mass.

The above-mentioned results are shown in Tables 1 to 3 below.

TABLE 1

| | Heating temperature (° C.) | Amount of the unburned carbon (mass %) | 45 μm sieve Residue (mass %) |
|---|---|---|---|
| Raw material | | 3.4 | 18.2 |
| Comp. Ex. 1 | 750 | 1.3 | 15.0 |
| Example 1 | 780 | 1.0 | 16.0 |
| Example 2 | 850 | 0.0 | 39.5 |

TABLE 2

| | | Recovery ratio (mass %) | 45 μm sieve residue (mass %) | Median diameter (μm) |
|---|---|---|---|---|
| Example 1 | coarse powder | 2 | — | — |
| | fine powder | 98 | 14.3 | 13.7 |
| Example 2 | coarse powder | 25.9 | — | — |
| | fine powder | 74.1 | 18.3 | 10.3 |

TABLE 3

| | 45 μm sieve residue (mass %) |
|---|---|
| Example 1 | 14.8 |
| Example 2 | 24 |

Reference Example

Concrete Tests;

By using the raw material, i.e., the raw fly ash powder and the reformed fly ashes reformed as described in Comparative Example 1, Examples 1 and 2, there were conducted the concrete tests. The cement was an ordinary Portland cement (NC) produced in Japan. The raw fly ash and the reformed fly ash were mixed in an amount of 20 internal % by mass into the cement.

Table 4 shows the blended ratios of the concretes.

The coarse aggregates that were used possessed a maximum size of 20 mm and a bulk volume of 0.57 m²/m² (Comparative Example 1) or 0.56 m²/m² (Comparative Example 1, Examples 1 and 2). The amount of water (W) per a unit volume was 55% by mass per the total amount of the raw fly ash or the reformed fly ash (FA) and the cement (C).

First, by using the raw fly ash (raw powder) without removing the unburned carbon and the fly ash of Comparative Example 1, blending of the concrete was so determined that the slump was 18.0±1.5 cm and the amount of the air was 4.5±0.5%. Blending conditions of Comparative Example 1 were also directly applied to Examples 1 and 2.

Table 5 shows fresh properties of the concretes.

The raw fly ash and the fly ash of Comparative Example 1 exhibited similar fresh properties despite they contained the AE agent in different amounts. It was, therefore, confirmed that the amount of the unburned carbon could be decreased by heating. Examples 1 and 2 showed increased slumps and increased amount of the air and, therefore, favorable results despite the blending conditions were the same as those of Comparative Example 1.

TABLE 4

| Example | Unit amount (kg/m³) | | | | | Admixture (%) | |
| --- | --- | --- | --- | --- | --- | --- | --- |
| | W | C | FA | S | G | AE water reducing agent | AE agent |
| Raw powder | 169 | 246 | 61 | 843 | 952 | 0.25 | 0.008 |
| Comp. Ex. 1 | 164 | 238 | 60 | 879 | 935 | 0.25 | 0.002 |
| Example 1 | 164 | 238 | 60 | 879 | 935 | 0.25 | 0.002 |
| Example 2 | 164 | 238 | 60 | 879 | 935 | 0.25 | 0.002 |

W: tap water,
C: cement,
FA: fly ash,
S: fine aggregate,
G: coarse aggregate

TABLE 5

| Example | Slump (cm) | Amount of the air (%) | Kneading temp. (° C.) |
| --- | --- | --- | --- |
| Raw powder | 19.5 | 4.5 | 19.9 |
| Comp. Ex. 1 | 16.5 | 4.4 | 19.9 |
| Example 1 | 18.5 | 4.5 | 20.0 |
| Example 2 | 18.0 | 5.3 | 20.0 |

DESCRIPTION OF REFERENCE NUMERALS

1: heating apparatus
3: classifying apparatus
5: dust-collecting apparatus
7: cooling apparatus
9: milling apparatus
10: mixing apparatus

The invention claimed is:

1. A process for reforming a fly ash, including:
a heating step that heats a raw fly ash powder containing an unburned carbon at a temperature of 780 to 1000° C. to decrease the amount of the unburned carbon contained in the raw fly ash powder;
a classifying step that introduces the heat-treated fly ash containing the unburned carbon in decreased amounts obtained through said heating step into a classifying apparatus while conveying it maintaining a temperature of not lower than 400° C. so that the fly ash is separated into a coarse powder and a fine powder;
a fine powder recovering step that recovers the fine powder of the heat-treated fly ash obtained through said classifying step by using a dust-collecting apparatus; and
a milling step that mills the coarse powder of the heat-treated fly ash obtained through said classifying step until a 45 μm sieve residue becomes not more than 34% by mass, and then recovers a milled powder.

2. The process for reforming the fly ash according to claim 1, wherein the amount of the unburned carbon is decreased down to less than 3% by mass through said heating step.

3. The process for reforming the fly ash according to claim 2, wherein heating in said heating step is so executed that 50% by mass is not reached by a content of massive grains that have a maximum diameter of not less than 150 μm contained in the heat-treated fly ash in which the amount of the unburned carbon has been decreased.

4. The process for reforming the fly ash according to claim 1, wherein a 45 μm sieve residue of the fine powder obtained by the classification is not more than 34% by mass.

5. The process for reforming the fly ash according to claim 1, wherein the coarse powder of the heat-treated fly ash obtained through said classifying step is milled after having been cooled down to not higher than 200° C.

6. The process for reforming the fly ash according to claim 1, wherein said fine powder recovered from said dust-collecting apparatus is mixed with the milled powder recovered in said milling step.

7. An apparatus for reforming a fly ash including a heating apparatus capable of heating a raw fly ash powder containing an unburned carbon to a temperature of 780 to 1000° C., a pipe for conveying a heat-treated fly ash obtained by being heated by said heating apparatus maintaining a temperature of not lower than 400° C., a classifying apparatus for classifying the heat-treated fly ash obtained by being heated by said heating apparatus, a dust-collecting apparatus for recovering a fine powder obtained by being classified by said classifying apparatus, a cooling apparatus for cooling a coarse powder obtained by being classified by said classifying apparatus, and a milling apparatus for milling said coarse powder cooled by said cooling apparatus.

8. The apparatus for reforming the fly ash according to claim 7, wherein said classifying apparatus is a wind power classifying apparatus.

9. The apparatus for reforming the fly ash according to claim 7, wherein the reforming apparatus further includes a mixing apparatus for mixing said fine powder recovered from said dust-collecting apparatus with said milled powder recovered from said milling apparatus.

* * * * *